(12) United States Patent
Zhang

(10) Patent No.: US 12,498,855 B2
(45) Date of Patent: Dec. 16, 2025

(54) STORAGE SYSTEM, DATA STORAGE METHOD, DATA READ METHOD, AND STORAGE MEDIUM

(71) Applicant: SUZHOU METABRAIN INTELLIGENT TECHNOLOGY CO., LTD., Jiangsu (CN)

(72) Inventor: Xueqing Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/115,751

(22) PCT Filed: May 24, 2024

(86) PCT No.: PCT/CN2024/095329
§ 371 (c)(1),
(2) Date: Mar. 26, 2025

(65) Prior Publication Data
US 2025/0258604 A1    Aug. 14, 2025

(30) Foreign Application Priority Data
Sep. 20, 2023 (CN) .......................... 202311213125.8

(51) Int. Cl.
*G06F 12/00* (2006.01)
*G06F 3/06* (2006.01)

(52) U.S. Cl.
CPC .......... *G06F 3/0611* (2013.01); *G06F 3/0619* (2013.01); *G06F 3/0659* (2013.01); *G06F 3/067* (2013.01)

(58) Field of Classification Search
CPC .............................. G06F 3/0619; G06F 3/0659
USPC ......................................................... 711/103
See application file for complete search history.

(56) References Cited

U.S. PATENT DOCUMENTS

2014/0359218 A1* 12/2014 Feng ................... H04L 67/1097
711/114
2020/0250032 A1* 8/2020 Goyal ................. H03M 13/373

FOREIGN PATENT DOCUMENTS

| CN | 106598499 A | 4/2017 |
|----|-------------|--------|
| CN | 109491599 A | 3/2019 |
| CN | 115016979 A | 9/2022 |
| CN | 116954523 A | 10/2023 |

* cited by examiner

*Primary Examiner* — Mohamed M Gebril
(74) *Attorney, Agent, or Firm* — IPro, PLLC

(57) ABSTRACT

A storage system, a data storage method, a data read method, and a storage medium are provided by the present application, and belong to the technical field of data storage. A central processing unit (CPU) of a main storage node of the system, after determining to-be-stored data in response to a data storage operation of a client sends the to-be-stored data to a data processing unit (DPU) of the main storage node; an erasure acceleration module of the DPU performs an erasure coding operation on the to-be-stored data to obtain a plurality of data blocks and a plurality of check blocks, determines corresponding address information of target storage devices according to state information of each storage device in an object storage device (OSD) fast hash table lookup module, and sends the data blocks or the check blocks of the to-be-stored data to a target storage node for storage.

20 Claims, 2 Drawing Sheets

STORAGE SYSTEM, DATA STORAGE METHOD, DATA READ METHOD, AND STORAGE MEDIUM

CROSS-REFERENCE TO RELATED APPLICATION

This application claims the priority of the Chinese Patent application filed on Sep. 20, 2023 before the China National Intellectual Property Administration with the application number of 202311213125.8, and the title of "STORAGE SYSTEM, DATA STORAGE METHOD, DATA READ METHOD, AND STORAGE MEDIUM", which is incorporated herein in its entirety by reference.

FIELD

Embodiments of the present application relate to the technical field of data storage and, more particularly, to a storage system, a data storage method, a data read method, and a storage medium.

BACKGROUND

With digital globalization, global storage data volume has surged at the Zettabyte (ZB) level. Although the performance of a single storage hard disk is gradually improved, and a central processing unit (CPU) in a storage device significantly improves a storage memory access bandwidth and a network interface bandwidth for storage, with changes in data volume and data processing requirements, users also put forward higher requirements on input/output performance of a storage system, for example, requirements on a higher bandwidth and improvement of input/output operations per second (IOPS), and a requirement on a lower delay. However, development of a semiconductor process technology slows down in the post-Moore era. Technical problems such as single-core computing power stagflation still bring huge performance improvement challenges to a storage system design.

Currently, distributed storage systems are widely applied. The distributed storage systems include dozens, hundreds, or even thousands of storage nodes. In a large distributed storage system on such a scale, node crashes or failures often occur, which easily lead to a problem of data loss. In order to solve the problem of data loss, efficient fault-tolerant mechanisms have emerged, that is, the data that is to be lost due to machine or device failure may be recovered. Currently, commonly used methods involve a multi-replica backup mechanism and an erasure mechanism.

The multi-replica backup mechanism may perform backup storage on data to ensure reliability of the data. For example, in a uniformly distributed storage system like Ceph, one piece of data is saved as 3 replicas by default, and a quantity of saved replicas is allowed to be customized. The Ceph adopts a CRUSH algorithm; in a large-scale cluster, quick and accurate storage of the data is achieved, at a same time, data migration may be minimized in a hardware failure or expansion of a hardware device. However, storage of a plurality of replicas of all data in the multi-replica backup mechanism needs to consume a lot of storage space, resulting in a low capacity utilization rate of a storage device; for example, the capacity utilization rate of the storage system with three backup replicas is only 33%.

The erasure mechanism, based on erasure code (EC), is a forward error correction technology, and is mainly applied to network transmission to avoid packet loss. Data is segmented into segments by using an erasure technology; redundant data blocks are expanded and coded, and the expanded and coded redundant data blocks are stored at different locations, for example, disks, storage nodes, or other geographic locations. The storage system may improve storage and reliability by using the erasure mechanism. Compared with multi-replica replication, higher data reliability may be achieved by using the erasure technology with lower data redundancy, that is, a stronger fault tolerance may be achieved with less additional storage overhead.

When a machine or component failure occurs in the distributed storage system, data reconstruction speed has a significant impact on the overall performance of a cluster. The EC needs to read data from a plurality of nodes to restore data at a damaged node when data reconstruction is performed. In a current distributed storage system cluster, various storage nodes have different hard disk Input/Output (I/O) pressures, network transmission pressures, and CPU utilization rate. There is a situation where a piece of data is read slowly due to unbalanced storage devices, network transmission, computing power, which may seriously affect the overall performance of the cluster.

SUMMARY

A storage system, a data storage method, a data read method, and a storage medium are provided by embodiments of the present application, aiming at reducing a delay of a storage process applying an erasure mechanism.

According to a first aspect, a data processing unit (DPU)-based storage system is provided by an embodiment of the present application. The storage system includes a plurality of storage nodes, wherein each storage node of the plurality of storage nodes includes a central processing unit (CPU), a DPU and a plurality of storage devices, the DPU includes an erasure acceleration module, an object storage device (OSD) fast hash table lookup module is disposed in the erasure acceleration module, the OSD fast hash table lookup module stores state information and address information of each storage device in the each storage node, wherein a plurality of storage nodes, wherein each storage node of the plurality of storage nodes includes a central processing unit (CPU), a DPU and a plurality of storage devices, the DPU includes an erasure acceleration module, an object storage device (OSD) fast hash table lookup module is disposed in the erasure acceleration module, the OSD fast hash table lookup module stores state information and address information of each storage device in the each storage node, wherein in response to a client corresponding to any one of the plurality of storage nodes storing data, the storage node serves as a main storage node;

a CPU of the main storage node is configured to, after determining to-be-stored data in response to a data storage operation of the client, send the to-be-stored data to a DPU of the main storage node;

the erasure acceleration module of the DPU is configured to perform an erasure coding operation on the to-be-stored data to obtain a plurality of data blocks and a plurality of check blocks, determine address information of target storage devices respectively corresponding to each data block and each check block of the to-be-stored data according to the state information of each storage device in the OSD fast hash table lookup module, and send storage notification information to a target storage node where each target storage device is located, wherein a same target storage device is configured to store one data block or one check block of the to-be-stored data; and the erasure acceleration module of the DPU is configured to send, in response to data storage information sent by any target storage node, the data block or the check block of the to-be-stored data corresponding to the data storage information to the target storage node for storage.

In some embodiments, the erasure acceleration module of the DPU includes a field programmable gate array (FPGA) module and a system on chip (SoC) module, and the OSD fast hash table lookup module is disposed on the FPGA module;

the FPGA module is configured to apply for a target storage memory according to a quantity of the data blocks and a quantity of the check blocks generated by the erasure coding operation;

the SoC module is configured to store the plurality of data blocks and the plurality of check blocks of the to-be-stored data in the target storage memory of the FPGA module after performing the erasure coding operation;

the SoC module is configured to invoke the OSD fast hash table lookup module, determine and store the address information of the target storage devices respectively corresponding to each data block and each check block of the to-be-stored data according to the state information of each storage device in the OSD fast hash table lookup module, and send the storage notification information to the target storage node where each target storage device is located; and in response to the SoC module responding to the data storage information sent by any target storage node, the SoC module is configured to send the data block or the check block of the to-be-stored data corresponding to the data storage information to the target storage node, and the DPU of the target storage node stores the data in the target storage device.

In some embodiments, the state information of each storage device stored in the OSD fast hash table lookup module includes health state information and remaining capacity information; and the SoC module is configured to select, according to the health state information and the remaining capacity information of each storage device in the OSD fast hash table lookup module, a storage device that is in a health state and has a remaining capacity greater than a preset capacity as the target storage device for storing the data block or the check block of the to-be-stored data.

In some embodiments, the state information of each storage device stored in the OSD fast hash table lookup module includes health state information and remaining capacity information; and the SoC module is configured to obtain all storage devices in a health state in the OSD fast hash table lookup module, sort remaining capacities of all the storage devices in the health state from large to small, and select first N storage devices as target storage devices, wherein a value of N is equal to a sum of the quantity of the data blocks and the quantity of the check blocks of the to-be-stored data.

In some embodiments, the SoC module is configured to encapsulate the to-be-stored data into a preset message format for storage according to the address information of the target storage devices respectively corresponding to each data block and each check block of the to-be-stored data.

In some embodiments, in response to the client corresponding to any one of the plurality of storage nodes reading the data, the storage node serves as the main storage node;

the CPU of the main storage node is configured to send data read information to the DPU of the main storage node in response to a data read operation of the client, wherein the data read information includes to-be-read data;

the erasure acceleration module of the DPU of the main storage node is configured to determine the address information of target read devices respectively corresponding to each data block and each check block of the to-be-read data through the OSD fast hash table lookup module, and obtain a plurality of pieces of shard data of the to-be-read data stored in each target read device, wherein the shard data includes a data block and a check block;

the erasure acceleration module of the DPU of the main storage node is configured to generate raw data of the to-be-read data according to the plurality of pieces of shard data of the to-be-read data, and send the raw data to the CPU of the main storage node; and the CPU of the main storage node is configured to send the raw data of the to-be-read data to the client.

In some embodiments, the erasure acceleration module of the DPU includes a field programmable gate array (FPGA) module and a system on chip (SoC) module, and the OSD fast hash table lookup module is disposed on the FPGA module;

the SoC module is configured to invoke the OSD fast hash table lookup module disposed on the FPGA module in response to the data read information to determine the address information of the target read devices respectively corresponding to each data block and each check block of the to-be-read data; and the SoC module is configured to obtain the plurality of pieces of shard data of the to-be-read data stored in each target read device through a remote direct memory access (RDMA) network, generate the raw data of the to-be-read data according to the plurality of pieces of shard data of the to-be-read data, and send the raw data to the CPU of the main storage node.

In some embodiments, in response to the plurality of pieces of shard data of the to-be-read data including all data blocks, the SoC module is configured to form the raw data of the to-be-read data according to all the data blocks; and in response to any data block being missing from the plurality of pieces of shard data of the to-be-read data, the SoC module is configured to store the plurality of pieces of shard data of the to-be-read data in a memory of the FPGA module, and perform an erasure decoding operation on the plurality of pieces of shard data of the to-be-read data to generate the raw data of the to-be-read data.

In some embodiments, the SoC module is further configured to, after obtaining and analyzing the state information of each storage device in each storage node in response to the data read information, invoke an OSD fast hash table updater to update the state information of each storage device in the OSD fast hash table lookup module.

In some embodiments, the SoC module is further configured to, after obtaining and analyzing the state information of each storage device in each storage node every other preset interval, invoke an OSD fast hash table updater to update the state information of each storage device in the OSD fast hash table lookup module.

In some embodiments, the DPU and the CPU on each storage node perform data transmission through a peripheral component interconnect express (PCIe) bus.

In some embodiments, the CPU of the main storage node is configured to divide, according to a preset erasure mode, the to-be-stored data into a plurality of data blocks in a quantity corresponding to the preset erasure mode, and send the plurality of data blocks to the DPU; and the erasure acceleration module of the DPU is configured to perform the erasure coding operation on the plurality of to-be-stored data blocks according to the preset erasure mode.

In some embodiments, the preset erasure mode includes an erasure code (EC) algorithm and a redundancy mode, wherein the EC algorithm includes at least one of an array EC algorithm, a reed-solomon (RS) EC algorithm, and a low density parity check EC algorithm.

In some embodiments, the redundancy mode includes a 4+2 redundancy mode, or a 6+3 redundancy mode, wherein the 4+2 redundancy mode includes 4 data blocks and 2 check blocks; and the 6+3 redundancy mode includes 6 data blocks and 3 check blocks.

In some embodiments, the plurality of storage nodes includes a management storage node;

after the management storage node monitors a data storage operation or a data read operation of any client, client software in the management storage node is configured to create handler to obtain cluster configuration information of the plurality of storage nodes;

a storage monitor disposed in the management storage node is configured to obtain storage device mapping information of a cluster of the plurality of storage nodes, and the storage device mapping information includes an area to which each storage device belongs and address information of each storage device; and the management storage node is configured to determine the main storage node corresponding to the client according to the cluster configuration information, and send the data storage operation or the data read operation of the client to the main storage node.

In some embodiments, an independent power supply is disposed on each storage node, and the independent power supply is configured to supply power to the DPU of the storage node.

In some embodiments, each storage node of the storage system includes a baseboard management controller (BMC) and a fan; and the BMC is configured to control a rotating speed of the fan according to a current temperature of the DPU to dissipate heat from the DPU.

In a second aspect, a data storage method for the data processing unit (DPU)-based storage system is provided by the embodiments of the present application, the method is applied to the storage system of the first aspect of the embodiments, and the method includes:

in response to the data storage operation of the client, obtaining the to-be-stored data and the main storage node corresponding to the client;

after determining, by the central processing unit (CPU) of the main storage node, the to-be-stored data in response to the data storage operation of the client, sending the to-be-stored data to the DPU of the main storage node;

performing, by the erasure acceleration module of the DPU, an erasure coding operation on the to-be-stored data to obtain the plurality of data blocks and the plurality of check blocks, determining the address information of the target storage devices respectively corresponding to each data block and each check block of the to-be-stored data according to the state information of each storage device in the object storage device (OSD) fast hash table lookup module, and sending the storage notification information to the target storage node where each storage device is located, wherein the same target storage device is configured to store one data block or one check block of the to-be-stored data; and sending, by the erasure acceleration module of the DPU in response to the data storage information sent by any target storage node, the data block or the check block of the to-be-stored data corresponding to the data storage information to the target storage node for the storage.

In a third aspect, a data read method for the data processing unit (DPU)-based storage system by the embodiments of the present application, the method is applied to the storage system of the embodiments, and the method includes:

in response to the data read operation of the client, obtaining the to-be-read data and the main storage node corresponding to the client;

sending, by the central processing unit (CPU) of the main storage node, data read information to the DPU of the main storage node in response to the data read operation of the client, wherein the data read information includes the to-be-read data;

determining, by the erasure acceleration module of the DPU of the main storage node, the address information of the target read devices respectively corresponding to each data block and each check block of the to-be-read data through the object storage device (OSD) fast hash table lookup module, and obtaining the plurality of pieces of shard data of the to-be-read data stored in each target read device, wherein the shard data includes the data block and the check block;

generating, by the erasure acceleration module of the DPU of the main storage node, the raw data of the to-be-read data according to the plurality of pieces of shard data of the to-be-read data, and sending the raw data to the CPU of the main storage node; and sending, by the CPU of the main storage node, the raw data of the to-be-read data to the client.

In a fourth aspect, a computer non-transitory readable storage medium is provided by the embodiments of the present application, wherein the computer non-transitory readable storage medium stores a computer program, and the computer program implements the data storage method for the data processing unit (DPU)-based storage system according to the second aspect of the embodiments or the data read method for the DPU-based storage system according to the third aspect of the embodiments when executed by a processor.

The storage system provided by the present embodiment includes a plurality of storage nodes. Each storage node of the plurality of storage nodes includes a CPU, a DPU, and a plurality of storage devices. The DPU further includes an erasure acceleration module. An OSD fast hash table lookup module is disposed in the erasure acceleration module. The OSD fast hash table lookup module stores state information and address information of each storage device in the each storage node.

When data is stored, in response to a client corresponding to any one of the plurality of storage nodes storing data, the storage node serves as a main storage node. A CPU of the main storage node is configured to, after determining to-bestored data in response to a data storage operation of the client, send the to-be-stored data to a DPU of the main storage node; and the erasure acceleration module of the DPU performs an erasure coding operation on the to-be-stored data to obtain a plurality of data blocks and a plurality of check blocks, determines address information of target storage devices respectively corresponding to each data block and each check block of the to-be-stored data according to state information of each storage device in the OSD fast hash table lookup module, and sends the data blocks or the check blocks of the to-be-stored data to a target storage node for storage, that is, the data blocks or the check blocks of the to-be-stored data are stored in the target storage device by the DPU of the target storage node.

When data is read, the CPU of the main storage node is configured to send data read information to the DPU of the main storage node in response to a data read operation of a client. The data read information includes to-be-read data. The erasure acceleration module of the DPU of the main storage node is configured to determine address information of target read devices respectively corresponding to each data block and each check block of the to-be-read data through an OSD fast hash table lookup module, and obtain a plurality of pieces of shard data of the to-be-read data stored in each target read device. The shard data includes a data block and a check block. The erasure acceleration module of the DPU of the main storage node is configured to generate raw data of the to-be-read data according to the plurality of pieces of shard data of the to-be-read data, and send the raw data to the CPU of the main storage node. The CPU of the main storage node is configured to send the raw data of the to-be-read data to the client.

In this storage system, both the erasure coding operation and the erasure coding operation are unloaded to the DPU for performing, and the erasure acceleration module is disposed on the DPU, so that rates of erasure coding and decoding processes may be improved, a limitation on coding and decoding rates in an erasure process caused by uncertainty of low performance and high delay of a CPU software stack is avoided, meanwhile, the efficiency of the erasure process may also be improved, and a delay of a storage process applying an erasure mechanism is reduced.

BRIEF DESCRIPTION OF THE DRAWINGS

In order to more clearly illustrate the technical solutions of the embodiments of the present disclosure, the figures that are required to be used in the description of the embodiments of the present disclosure will be briefly introduced below. Apparently, the figures that are described below are some embodiments of the present disclosure, and a person skilled in the art may obtain other figures according to these figures without paying creative work.

DETAILED DESCRIPTION

Technical solutions in embodiments of the present application are clearly and completely described below with reference to drawings in the embodiments of the present application. Apparently, the described embodiments are some rather than all of the embodiments of the present application. All other embodiments obtained by those of ordinary skill in the art based on the embodiments of the present application without creative efforts fall within the scope of protection of the present application.

EC: Erasure Coding
DPU: Data Processing Unit
FPGA: Field Programmable Gate Array
SoC: System on Chip
OSD: Object Storage Device
I/O: Input/Output
CPU: Central Processing Unit
BMC: Baseboard Management Controller
API: Application Programming Interface
RS EC: Reed-Solomon Erasure Coding
RDMA: Remote Direct Memory Access When a machine or component failure occurs in the distributed storage system, data reconstruction speed has a significant impact on overall performance of a cluster. The EC needs to read data from a plurality of nodes to restore data at a damaged node when data reconstruction is performed. In a current distributed storage system cluster, various storage nodes have different hard disk I/O pressures, network transmission pressures, and CPU utilization rates. There is a situation where a piece of data is read slowly due to unbalanced storage devices, network transmission, computing power, which may seriously affect the overall performance of the cluster.

In order to reduce a delay of a storage process applying an erasure mechanism, a DPU-based storage system is provided by the present application.

Figure 1:
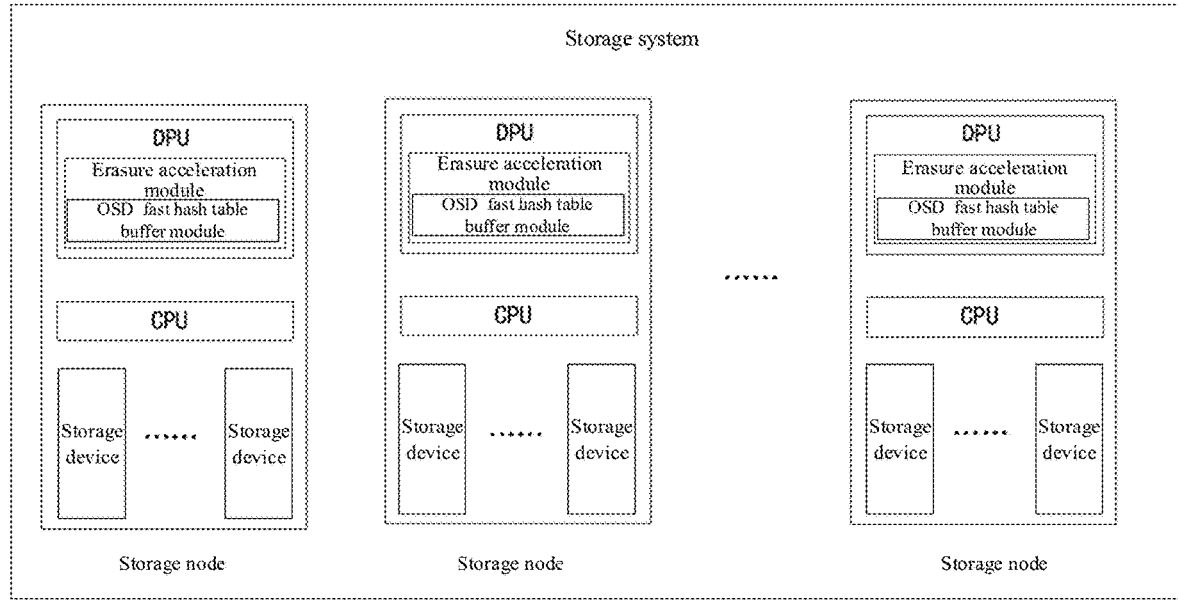
FIG. 1 is a schematic diagram of a DPU-based storage system according to an embodiment of the present application.

FIG. 1 is a schematic diagram of a DPU-based storage system according to an embodiment of the present application. The storage system includes a plurality of storage nodes. Each of the plurality of storage nodes includes a CPU, a DPU, and a plurality of storage devices.

In the storage system provided in the present embodiment, each storage node is installed with a DPU. The DPU is data-centric and network transmission hub-orientated dedicated processor for data acceleration processing, which may support unloading and hardware acceleration in scenarios such as a network, storage, security, virtualization, and streaming media. In addition, the DPU is a software and hardware integrated device. DPU software supports an API for erasure and data transmission. By providing rich software programming capabilities, an erasure operation of storage may be implemented to achieve higher performance, complexity of a software stack may be reduced, and an overall delay is reduced.

When the DPU is applied to perform the storage process applying the erasure mechanism, corresponding storage software may be written to the DPU, for example, raw data is segmented into k data blocks, m check blocks are generated by using the DPU according to a coding matrix, and n blocks (n=k+m) of data are stored at different locations. When data is read, the DPU erasure reads data from different data distribution locations, and obtains the raw data by using a matrix operation. Original data may be restored by using only k blocks.

In an actual implementation process, adaptive configuration may further be performed on heat dissipation, a power supply, and the like of CPU hardware when the CPU is installed on each storage node.

An independent power supply is disposed on each storage node. The independent power supply is configured to supply power to the DPU of the node. Considering high power consumption of the DPU, a single DPU power supply is generally lower than 200 W, so a power interface of the independent power supply needs to be provided in the storage node to supply power to the DPU instead of supply power through peripheral component interconnect express (PCIe).

Further, in order to optimize overall power consumption and heat dissipation, a corresponding heat dissipation policy may further be disposed on each storage node in the storage system. Each storage node of the storage system includes a BMC and a fan. A heat dissipation thread for the DPU is established in the BMC. Exemplarily, a current temperature of the DPU may be detected in real time, and then a rotating speed of the fan may be controlled to dissipate heat from the DPU.

In an actual implementation process, an independent fan may further be separately disposed for the DPU. A control policy for the independent fan is established in the BMC, so that the independent fan better dissipates heat from the DPU with relatively high power consumption.

Based on an excellent software programming capability of the DPU, an erasure acceleration module may be disposed in the DPU. An OSD fast hash table lookup module is disposed in the erasure acceleration module. The OSD fast hash table lookup module stores state information and address information of each storage device in each storage node.

In some embodiments, the plurality of storage nodes include a management storage node. After the management storage node monitors a data storage operation or a data read operation of any client, client software for performing storage of the CPU of the management storage node is configured to create handler to establish a connection with the plurality of storage nodes to obtain cluster configuration information of the plurality of storage nodes. A storage monitor disposed in the management storage node is configured to obtain storage device mapping information of a cluster of the plurality of storage nodes. The storage device mapping information includes an area to which each storage device belongs and address information of each storage device.

In a cluster configuration process, a relationship between the client and the corresponding main storage node is determined. When a data storage operation or a data read operation of any client is detected, the management storage node may forward the data storage operation or the data read operation to the main storage node corresponding to the client.

When data is stored in a client corresponding to any one of the plurality of storage nodes, the storage node serves as a main storage node, and then a CPU of the main storage node is configured to, after determining to-be-stored data in response to a data storage operation of the client, send the to-be-stored data to a DPU of the main storage node.

In some embodiments, a preset erasure mode is set in the storage system. Exemplarily, the erasure mode includes an EC algorithm and a redundancy mode. Exemplarily, the EC algorithm includes at least one of an array EC algorithm, a Reed-Solomon (RS) EC algorithm, and a low density parity check EC algorithm. The redundancy mode includes a 4+2 redundancy mode, or a 6+3 redundancy mode, wherein the 4+2 redundancy mode includes 4 data blocks and 2 check blocks; and the 6+3 redundancy mode includes 6 data blocks and 3 check blocks. There may be erasure modes combined by different EC algorithms and redundancy modes according to different application requirements. Exemplarily, an erasure process may be performed by using the RS EC algorithm and the 4+2 redundancy mode, or the erasure process may be performed by using the low density parity check EC algorithm and the 6+3 redundancy mode. This is not limited in the present embodiment.

In an actual implementation process, the erasure mode may be preset in a configuration file of the storage node, and then the CPU of the main storage node is configured to divide, according to the preset erasure mode, the to-be-stored data into a plurality of data blocks in a quantity corresponding to a preset erasure mode, and send the plurality of data blocks to the DPU. Exemplarily, the CPU may divide 1 MB of data into 16 KB segments in the 4+2 redundancy mode.

After the to-be-stored data is divided by the CPU according to the preset erasure mode, the DPU may be invoked to drive an API interface to send a plurality of to-be-stored data block to the DPU through a PCIe bus. Then, the erasure acceleration module of the DPU performs an erasure coding operation on the plurality of to-be-stored data blocks according to the preset erasure mode.

After performing the erasure coding operation on the to-be-stored data to obtain a plurality of data blocks and a plurality of check blocks, the erasure acceleration module of the DPU determines address information of target storage devices respectively corresponding to each data block and each check block of the to-be-stored data according to state information of each storage device in an OSD fast hash table lookup module.

In some embodiments, the same target storage device is configured to store one data block or one check block of the to-be-stored data. Exemplarily, 4 data blocks and 2 check blocks are generated by the to-be-stored data based on the 4+2 redundancy mode, and 6 target storage devices need to be determined, and one target storage device may only store one block of data, so that loss of a plurality of blocks of data caused by a failure of one target storage device may be avoided.

An area to which the target storage devices belong may be the same storage node. In a case that a requirement for data reliability is higher, one storage node may be set to have only one target storage device, so that the loss of the plurality of blocks of data caused by a failure of an overall storage node is avoided.

After determining address information of the target storage devices respectively corresponding to each data block and each check block of the to-be-stored data, the erasure acceleration module of the DPU sends storage notification information to a target storage node where each storage device is located. The erasure acceleration module of the DPU of the main storage node sends the storage notification information to the erasure acceleration module of the DPU of each target storage node to notify the target storage node that data may be read.

After the target storage node receives the storage notification information, the DPU of the target storage node sends data storage information to the DPU of the main storage node, and the erasure acceleration module of the main storage node sends, in response to the data storage information sent by any target storage node, the data block or the check block of the to-be-stored data corresponding to the data storage information to the target storage node for storage.

When a client corresponding to any one of the plurality of storage nodes reads data, this storage node serves as a main storage node. A CPU of the main storage node sends data read information to a DPU of the main storage node in response to a data read operation of the client. The data read information includes to-be-read data. An erasure acceleration module of the DPU of the main storage node determines address information of target read devices respectively corresponding to each data block and each check block of the to-be-read data through an OSD fast hash table lookup module, and obtains a plurality of pieces of shard data of the to-be-read data stored in each target read device. The shard data includes a data block and a check block. The erasure acceleration module of the DPU of the main storage node is configured to generate raw data of the to-be-read data according to the plurality of pieces of shard data of the to-be-read data, and send the raw data to the CPU of the main storage node. The CPU of the main storage node is configured to send the raw data of the to-be-read data to the client.

In this storage system, both the erasure coding operation and the erasure coding operation are unloaded to the DPU for performing, and the erasure acceleration module is disposed on the DPU, so that rates of erasure coding and decoding processes may be improved, a limitation on coding and decoding rates in an erasure process caused by uncertainty of low performance and high delay of a CPU software stack is avoided, meanwhile, the efficiency of the erasure process may be improved, and a delay of a storage process applying an erasure mechanism is reduced.

Figure 2:
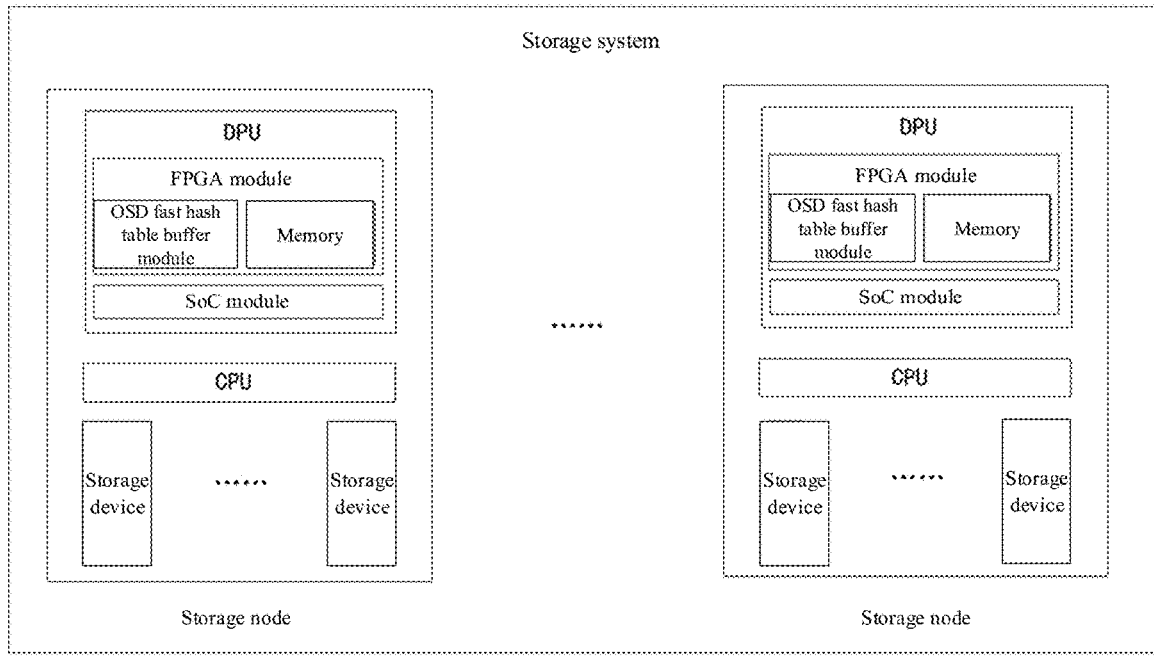
FIG. 2 is a schematic diagram of a DPU-based storage system according to an embodiment of the present application.

FIG. 2 is a schematic diagram of a DPU-based storage system according to an embodiment of the present application. As shown in FIG. 2, an erasure acceleration module of the DPU includes an FPGA module and a SoC module. The OSD fast hash table lookup module is disposed on the FPGA module.

When data is stored, after a CPU sends the to-be-stored data to a DPU, the FPGA module applies for a target storage memory according to a quantity of data blocks and a quantity of check blocks generated by the erasure coding operation; and then the SoC module stores the plurality of data blocks and the plurality of check blocks of the to-be-stored data in the target storage memory of the FPGA module after performing the erasure coding operation.

Then, the SoC module invokes the OSD fast hash table lookup module to determine and store address information of target storage devices respectively corresponding to each data block and each check block of the to-be-stored data according to state information of each storage device in OSD fast hash table lookup module.

In some embodiments, the state information of each storage device stored in the OSD fast hash table lookup module includes health state information and remaining capacity information; and the SoC module is configured to select, according to the health state information and the remaining capacity information of each storage device in the OSD fast hash table lookup module, a storage device that is in a health state and has a remaining capacity greater than a preset capacity as the target storage device for storing the data block or the check block of the to-be-stored data.

In some embodiments, the state information of each storage device stored in the OSD fast hash table lookup module includes health state information and remaining capacity information; and the SoC module is configured to obtain all storage devices in a health state in the OSD fast hash table lookup module, sort remaining capacities of all the storage devices in the health state from large to small, and select first N storage devices as target storage devices, wherein a value of N is equal to a sum of the quantity of the data blocks and the quantity of the check blocks of the to-be-stored data.

In some embodiments, after data is stored each time, the SoC module updates the state information of each storage device in the OSD fast hash table lookup module, and then determines a calibrated quantity of candidate storage devices according to the state information of each storage device. When data is stored next time, a target storage device is directly selected from the calibrated quantity of candidate storage devices, so that efficiency of each data storage process may be improved.

In some embodiments, other load balancing strategies may further be configured, so that the SoC module may allocate a storage task properly when determining the target storage device.

After determining the address information of the target storage devices respectively corresponding to each data block and each check block of the to be-stored data, the SoC module encapsulates the to-be-stored data into a preset message format for storage according to the address information of the target storage devices respectively corresponding to each data block and each check block of the to-be-stored data, that is, the preset message format may reflect a corresponding relation between each data block and each check block of the to-be-stored data and the corresponding target storage devices, so as to facilitate obtaining data from different target storage devices in a later stage.

Then, the SoC module sends storage notification information to the SoC module of the target storage node where each target storage device is located to notify that data may be read. The SoC module of the target storage node sends data storage information to the SoC module of the main storage node.

When the SoC module responds to the data storage information sent by any target storage node, the SoC module sends the data block or the check block of the to-be-stored data corresponding to the data storage information to the target storage node through a remote direct memory access (RDMA) network, and the SoC module in the DPU of the target storage device directly stores the data in the target storage device.

In this storage system, the DPU performs erasure coding and decoding processes, and the SoC module in the DPU replaces a CPU to directly store the data in the target storage device, which may further reduce a delay in a storage process.

When data is read, the CPU of the main storage node sends data read information containing the to-be-read data to the DPU through the PCIe bus. The SoC module on the DPU invokes, in response to the data read information, the OSD fast hash table lookup module disposed on the FPGA module and the preset message format of the to-be-read data encapsulated when the data is stored, and may determine address information of target read devices respectively corresponding to each data block and each check block of the to-be-read data. Then, the SoC module is configured to obtain, through the RDMA network, a plurality of pieces of shard data of the to-be-read data stored in each target read device. When the data is read, the data may be directly obtained from the target read device through the SoC module of the DPU on the target read device.

The SoC module of the main storage node generates raw data of the to-be-read data according to the plurality of pieces of shard data of the to-be-read data, and sends the raw data to the CPU of the main storage node. When the plurality of pieces of shard data of the to-be-read data includes all data blocks, the SoC module is configured to form the raw data of the to-be-read data according to all the data blocks. When any data block is missing from the plurality of pieces of shard data of the to-be-read data, the SoC module is configured to store the plurality of pieces of shard data of the to-be-read data in a memory of the FPGA module, and perform an erasure decoding operation on the plurality of pieces of shard data of the to-be-read data to generate the raw data of the to-be-read data.

Because an erasure mechanism allows part data to be invalid, exemplarily, in the 4+2 redundancy mode, in the 4 data blocks and 2 check blocks, if any 2 or fewer pieces of shard data are invalid, the raw data may still be restored through remaining data. If the lost shard data is 1 or 2 check blocks, the raw data of the to-be-read data may be obtained by directly combining the remaining 4 data blocks. When there is at least one data block in the lost shard data, the raw data of the to-be-read data may be obtained by performing the erasure decoding operation on the remaining data blocks and check blocks.

That is, in the 4+2 redundancy mode, the raw data of the to-be-read data may be generated by obtaining 4 pieces of shard data. Therefore, in a feasible implementation, the DPU may further be configured to read the shard data in a target read device corresponding to the at least 4 pieces of shard data of the to-be-read data, to reduce data transmission volume, thereby a delay of network transmission to an overall erasure process is reduced. If the DPU fails to read data from one of the target read devices or returned shard data is not received within preset time, remaining allocation data is read.

In some embodiments, the SoC module is further configured to, after obtaining and analyzing the state information of each storage device in each storage node in response to the data read information, invoke an OSD fast hash table updater to update the state information of each storage device in the OSD fast hash table lookup module. That is, when the data is read each time, the OSD fast hash table lookup module is updated, so that a state of each storage device stored in the OSD fast hash table lookup module may be updated in time, thereby an impact on a subsequent data storage process is reduced.

In some embodiments, the SoC module may further update the OSD fast hash table lookup module periodically. After obtaining and analyzing the state information of each storage device in each storage node every other preset interval, the SoC module invokes the OSD fast hash table updater to update the state information of each storage device in the OSD fast hash table lookup module.

In the storage system provided in the present embodiment, the DPU is configured to perform erasure coding and decoding processes, which avoids a relatively long delay in the erasure coding and decoding processes when the CPU processes too many threads or programs, reduces complexity of a software stack, avoids a computing impact of a CPU software stack, and reduces a delay of the erasure coding and decoding processes on the whole. In addition, the DPU is a software and hardware integrated device. By providing rich software programming capabilities, an erasure operation of storage may be implemented to achieve higher performance. FPGA+SoC architecture, and an operating structure that accelerates the erasure operation by using an SoC, and hardware and software logic are set on the DPU, a plurality of erasure algorithms may be supported, and an advantage of using flexibility is achieved. By using the storage system, an efficient fault-tolerant mechanism of a plurality of storage nodes for data is implemented, and performance and reliability of the storage system are improved.

Figure 3:
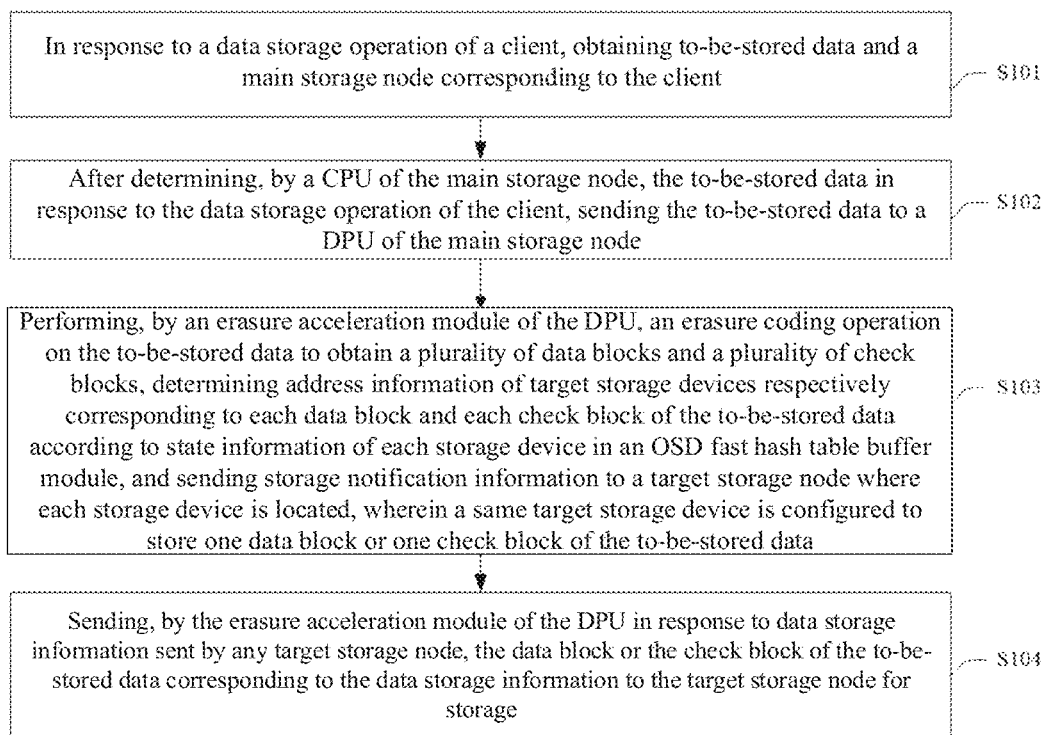
FIG. 3 is a flowchart of steps of a data storage method for a DPU-based storage system according to an embodiment of the present application.

FIG. 3 is a flowchart of steps of a data storage method for a DPU-based storage system according to an embodiment of the present application. The method is applied to the storage system according to the embodiments. The method includes the following steps:

S101: in response to a data storage operation of a client, obtaining to-be-stored data and a main storage node corresponding to the client.

Exemplarily, the plurality of storage nodes include a management storage node. After the management storage node monitors a data storage operation or a data read operation of any client, client software of the CPU of the management storage node is configured to create handler to establish a connection with the plurality of storage nodes to obtain cluster configuration information of the plurality of storage nodes. A storage monitor obtains storage device mapping information of a cluster of the plurality of storage nodes, including an area to which each storage device belongs and address information of each storage device.

When a data storage operation or a data read operation of any client is detected, the management storage node may forward the data storage operation or the data read operation to the main storage node corresponding to the client.

S102: after determining, by a CPU of the main storage node, the to-be-stored data in response to the data storage operation of the client, sending the to-be-stored data to a DPU of the main storage node.

The CPU of the main storage node is configured to divide, according to the preset erasure mode, the to-be-stored data into a plurality of data blocks in a quantity corresponding to a preset erasure mode, and send the plurality of data blocks to the DPU. For example, the CPU may divide 1 MB of data into 16 KB segments in the 4+2 redundancy mode.

S103: performing, by an erasure acceleration module of the DPU, an erasure coding operation on the to-be-stored data to obtain a plurality of data blocks and a plurality of check blocks, determining address information of target storage devices respectively corresponding to each data block and each check block of the to-be-stored data according to state information of each storage device in an OSD fast hash table lookup module, and sending storage notification information to a target storage node where each storage device is located, wherein the same target storage device is configured to store one data block or one check block of the to-be-stored data.

Exemplarily, the erasure acceleration module of the DPU includes an FPGA module and a SoC module, and the OSD fast hash table lookup module is disposed on the FPGA module.

When data is stored, after the CPU sends the to-be-stored data to the DPU, the FPGA module applies for a target storage memory; and then the SoC module stores the plurality of data blocks and the plurality of check blocks of the to-be-stored data in the target storage memory of the FPGA module after performing the erasure coding operation.

Next, the SoC module invokes the OSD fast hash table lookup module, and determine and store address information of target storage devices respectively corresponding to each data block and each check block of the to-be-stored data according to state information of each storage device in the OSD fast hash table lookup module. Exemplarily, the to-be-stored data is stored after being encapsulated into a preset message format.

Then, the SoC module sends storage notification information to the SoC module of the target storage node where each target storage device is located to notify that data may be read. The SoC module of the target storage node sends data storage information to the SoC module of the main storage node.

S104: sending, by the erasure acceleration module of the DPU in response to data storage information sent by any target storage node, the data block or the check block of the to-be-stored data corresponding to the data storage information to the target storage node for storage.

When the SoC module responds to the data storage information sent by any target storage node, the SoC module sends the data block or the check block of the to-be-stored data corresponding to the data storage information to the target storage node through an RDMA network, and the SoC module in the DPU of the target storage device directly stores the data in the target storage device.

Figure 4:
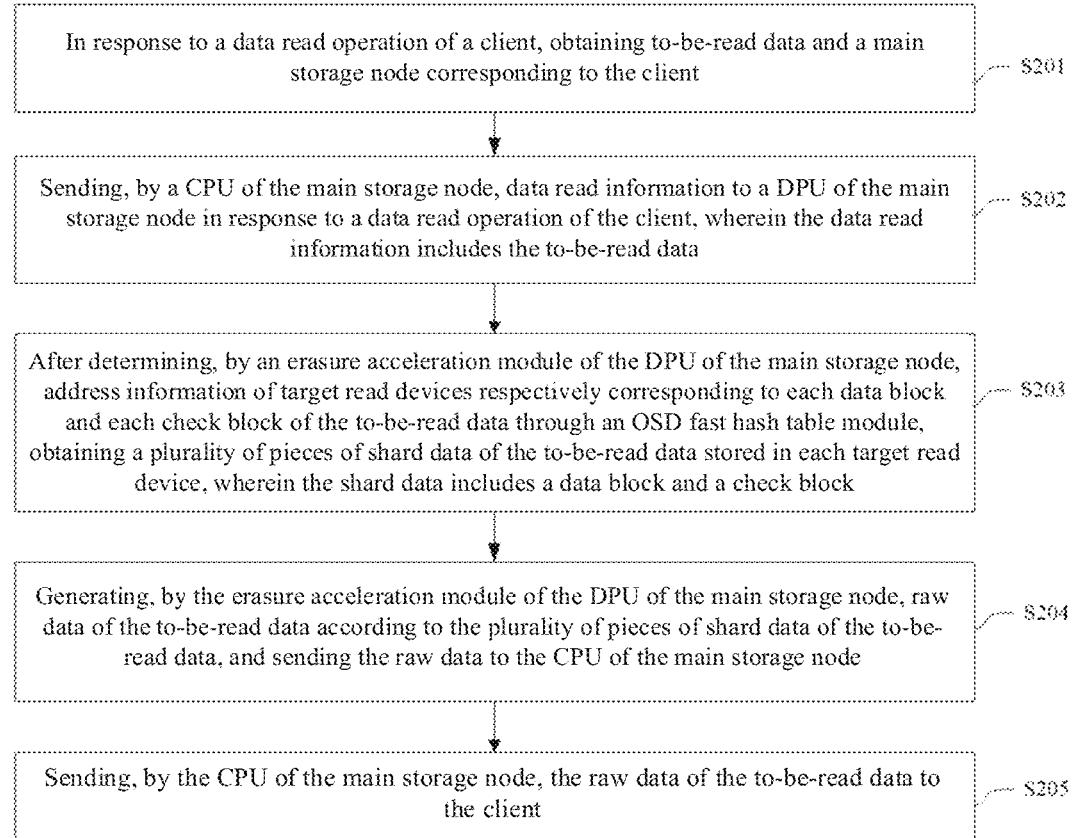
FIG. 4 is a flowchart of steps of a data read method for a DPU-based storage system according to an embodiment of the present application.

FIG. 4 is a flowchart of steps of a data read method for a DPU-based storage system according to an embodiment of the present application. The method is applied to the storage system in the embodiments. The method includes following steps:

S201: in response to a data read operation of a client, obtaining to-be-read data and a main storage node corresponding to the client.

S202: sending, by a CPU of the main storage node, data read information to a DPU of the main storage node in response to a data read operation of the client, wherein the data read information includes to-be-read data.

S203: after determining, by an erasure acceleration module of the DPU of the main storage node, address information of target read devices respectively corresponding to each data block and each check block of the to-be-read data through an OSD fast hash table lookup module, obtaining a plurality of pieces of shard data of the to-be-read data stored in each target read device, wherein the shard data includes a data block and a check block.

The SoC module on the DPU invokes, in response to the data read information, the OSD fast hash table lookup module disposed on the FPGA module and the preset message format of the to-be-read data encapsulated when the data is stored, and determines address information of target read devices. Then, the SoC module is configured to obtain, through the RDMA network, a plurality of pieces of shard data of the to-be-read data from each target read device. When data is read, the data may be directly obtained from the target read device through the SoC module of the DPU on the target read device.

S204: generating, by the erasure acceleration module of the DPU of the main storage node, raw data of the to-be-read data according to the plurality of pieces of shard data of the to-be-read data, and sending the raw data to the CPU of the main storage node.

When the plurality of pieces of shard data include all data blocks, the SoC module form raw data of the to-be-read data according to all the data blocks. When any data block is missing from the plurality of pieces of shard data of the to-be-read data, the SoC module stores the plurality of pieces of shard data of the to-be-read data in a memory of the FPGA module, and performs an erasure decoding operation on the plurality of pieces of shard data of the to-be-read data to generate the raw data of the to-be-read data.

S205: sending, by the CPU of the main storage node, the raw data of the to-be-read data to the client.

A computer non-transitory readable storage medium is further provided by an embodiment of the present application. The computer non-transitory readable storage medium stores a computer program. The computer program implements the data storage method for a DPU-based storage system according to the embodiments, or the data read method for a DPU-based storage system according to the embodiments when executed by a processor.

Various embodiments in the present specification are described in a progressive manner. Each embodiment focuses on differences from other embodiments, and the same and similar parts of various embodiments may be referred to one another.

A person skilled in the art understands that embodiments of the present application may be provided as a method, an apparatus, or a computer program product. Therefore, the embodiments of the present application may adopt a form of hardware-only embodiments, software-only embodiments, or embodiments combining software and hardware. Moreover, the embodiments of the present application may adopt a form of a computer program product implemented on one or more computer available storage media (including, but not limited to, a disk storage, a compact disk read-only memory (CD-ROM), optical storage, and the like) containing computer available program code.

The embodiments of the present application are described with reference to flowcharts and/or block diagrams of a method, a terminal device (system), and a computer program product according to the embodiments of the present application. It is to be understood that computer program instructions implement each process and/or block in the flowchart and/or block diagram, as well as combinations of processes and/or blocks in the flowchart and/or block diagram. These computer program instructions may be provided to a general-purpose computer, a special-purpose computer, an embedded processor, or a processor of another programmable data processing terminal device to produce a machine, so that instructions executed by the computer or the processor of the another programmable data processing terminal device produce an apparatus for implementing an actual function in one or more processor in the flowcharts and/or one or in one or more blocks in the block diagrams.

These computer program instructions may alternatively be stored in a computer-readable memory that may instruct a computer or another programmable data processing terminal device to work in an actual mode, so that the instructions stored in the computer-readable memory generate an artifact that includes an instruction apparatus. The instruction apparatus implements an actual function in one or more procedures in the flowcharts and/or in one or more blocks in the block diagrams.

These computer program instructions may further be loaded onto a computer or another programmable terminal device, so that a series of operation steps are performed on the computer or the another programmable data processing terminal device, thereby generating computer-implemented processing. Therefore, the instructions executed on the computer or the other programmable terminal devices provide steps for implementing an actual function in one or more processes in the flowcharts and/or in one or more blocks in the block diagrams.

Although some embodiments of the present application have been described, a person skilled in the art may make additional variations and modifications to these embodiments once the basic inventive concept is known. Therefore, it is intended that the appended claims are to be interpreted as including the embodiments and all variations and modifications that fall within the scope of the present application.

Finally, it is also to be noted that relational terms such as first and second are only used to distinguish one entity or operation from another entity or operation herein, and do not necessarily require or imply the existence of any such actual relationship or order between these entities or operations. Moreover, terms "include", "contain" or any other variations thereof are intended to cover a non-exclusive inclusion, such that a process, method, article or terminal device including a series of elements not only includes those elements, but also includes those elements that are not explicitly listed, or includes elements inherent to such a process, method, article or terminal device. In the absence of more restrictions, elements defined by the phrase "include a/an . . . " do not exclude the existence of additional identical elements in the process, method, commodity, or terminal device that includes the elements.

Herein, examples are used for describing principles and implementations of the present application. The description of the embodiments above is merely intended to help understand the method of the present application and a core idea thereof. In addition, those of ordinary skill in the art may make modifications based on the idea of the present application with respect to implementations and application scopes. In conclusion, the specification is not to be understood as a limitation to the present application.

The invention claimed is:

1. A data processing unit (DPU)-based storage system, comprising a plurality of storage nodes, wherein each of the plurality of storage nodes comprises a central processing unit (CPU), a DPU and a plurality of storage devices, the DPU comprises an erasure acceleration module, the erasure acceleration module comprises a field programmable gate array (FPGA) module and a system on chip (SoC) module; an object storage device (OSD) hash table lookup module is disposed in the FPGA module, the OSD hash table lookup module stores state information and address information of each storage device in each storage node, wherein
 a client corresponds to a main storage node among the plurality of storage nodes;
 a CPU of the main storage node is configured to, after determining first data in response to a data storage operation of the client, send the first data to a DPU of the main storage node;
 in the erasure acceleration module of the DPU, the SoC module is configured to store, after performing an erasure coding operation on the first data to obtain a plurality of data blocks and a plurality of check blocks, the plurality of data blocks and the plurality of check blocks in the FPGA module, invoke the OSD hash table lookup module, determine address information of target storage devices respectively corresponding to each data block and each check block of the first data according to the state information of each storage device in the OSD hash table lookup module, and send storage notification information to a target storage node where each target storage device is located, wherein a same target storage device is configured to store one data block or one check block of the first data; and
 in the erasure acceleration module of the DPU, the SoC module is configured to send, in response to data storage information sent by any target storage node, the data block or the check block of the first data corresponding to the data storage information to the target storage node for storage.

2. The system according to claim 1, wherein FPGA module is configured to apply for a target storage memory according to a quantity of the data blocks and a quantity of the check blocks generated by the erasure coding operation.

3. The system according to claim 2, wherein the state information of each storage device stored in the OSD hash table lookup module comprises health state information and remaining capacity information; and
 the SoC module is configured to select, according to the health state information and the remaining capacity information of each storage device in the OSD hash table lookup module, a storage device that is in a health state and has a remaining capacity greater than a preset capacity as the target storage device for storing the data block or the check block of the first data.

4. The system according to claim 2, wherein the state information of each storage device stored in the OSD hash table lookup module comprises health state information and remaining capacity information; and
 the SoC module is configured to obtain all storage devices in a health state in the OSD hash table lookup module, sort remaining capacities of all the storage devices in the health state from large to small, and select first N storage devices as target storage devices, wherein a value of N is equal to a sum of the quantity of the data blocks and the quantity of the check blocks of the first data.

5. The system according to claim 2, wherein the SoC module is configured to encapsulate the first data into a preset message format for storage according to the address information of the target storage devices respectively corresponding to each data block and each check block of the first data.

6. The system according to claim 1, wherein
 the CPU of the main storage node is configured to send data read information to the DPU of the main storage node in response to a data read operation of the client, wherein the data read information comprises second data;
 the erasure acceleration module of the DPU of the main storage node is configured to determine the address information of target read devices respectively corresponding to each data block and each check block of the second data through the OSD hash table lookup module, and obtain a plurality of pieces of shard data of the second data stored in each target read device, wherein the shard data comprises a data block and a check block;
 the erasure acceleration module of the DPU of the main storage node is configured to generate raw data of the second data according to the plurality of pieces of shard data of the second data, and send the raw data to the CPU of the main storage node; and
 the CPU of the main storage node is configured to send the raw data of the second data to the client.

7. The system according to claim 6, wherein the SoC module is configured to invoke the OSD hash table lookup module disposed on the FPGA module in response to the data read information to determine the address information of the target read devices respectively corresponding to each data block and each check block of the second data; and
 the SoC module is configured to obtain the plurality of pieces of shard data of the second data stored in each target read device through a remote direct memory access (RDMA) network, generate the raw data of the second data according to the plurality of pieces of shard data of the second data, and send the raw data to the CPU of the main storage node.

8. The system according to claim 7, wherein
 in response to the plurality of pieces of shard data of the second data comprising all data blocks, the SoC module is configured to form the raw data of the second data according to all the data blocks; and
 in response to any data block being missing from the plurality of pieces of shard data of the second data, the SoC module is configured to store the plurality of pieces of shard data of the second data in a memory of the FPGA module, and perform an erasure decoding operation on the plurality of pieces of shard data of the second data to generate the raw data of the second data.

9. The system according to claim 7, wherein the SoC module is further configured to, after obtaining and analyzing the state information of each storage device in each storage node in response to the data read information, invoke an OSD hash table updater to update the state information of each storage device in the OSD hash table lookup module.

10. The system according to claim 7, wherein the SoC module is further configured to, after obtaining and analyzing the state information of each storage device in each storage node every other preset interval, invoke an OSD hash table updater to update the state information of each storage device in the OSD hash table lookup module.

11. The system according to claim 1, wherein the DPU and the CPU on each storage node perform data transmission through a peripheral component interconnect express (PCIe) bus.

12. The system according to claim 1, wherein the CPU of the main storage node is configured to divide, according to a preset erasure mode, the first data into a plurality of data blocks in a quantity corresponding to the preset erasure mode, and send the plurality of data blocks to the DPU; and
the erasure acceleration module of the DPU is configured to perform the erasure coding operation on the plurality of first data blocks according to the preset erasure mode.

13. The system according to claim 12, wherein the preset erasure mode comprises an erasure code (EC) algorithm and a redundancy mode, wherein the EC algorithm comprises at least one of an array EC algorithm, a reed-solomon (RS) EC algorithm, and a low density parity check EC algorithm.

14. The system according to claim 13, wherein the redundancy mode comprises a 4+2 redundancy mode, or a 6+3 redundancy mode, wherein
the 4+2 redundancy mode comprises 4 data blocks and 2 check blocks; and
the 6+3 redundancy mode comprises 6 data blocks and 3 check blocks.

15. The system according to claim 6, wherein the plurality of storage nodes comprises a management storage node;
after the management storage node monitors a data storage operation or a data read operation of any client, client software in the management storage node is configured to create handler to obtain cluster configuration information of the plurality of storage nodes;
a storage monitor disposed in the management storage node is configured to obtain storage device mapping information of a cluster of the plurality of storage nodes, and the storage device mapping information comprises an area to which each storage device belongs and address information of each storage device; and
the management storage node is configured to determine the main storage node corresponding to the client according to the cluster configuration information, and send the data storage operation or the data read operation of the client to the main storage node.

16. The system according to claim 1, wherein an independent power supply is disposed on each storage node, and the independent power supply is configured to supply power to the DPU of the storage node.

17. The system according to claim 1, wherein each storage node of the storage system comprises a baseboard management controller (BMC) and a fan; and
the BMC is configured to control a rotating speed of the fan according to a current temperature of the DPU to dissipate heat from the DPU.

18. A data storage method for the data processing unit (DPU)-based storage system, applied to the storage system according to claim 1, and comprising:
in response to the data storage operation of the client, obtaining the first data and the main storage node corresponding to the client;
after determining, by the central processing unit (CPU) of the main storage node, the first data in response to the data storage operation of the client, sending the first data to the DPU of the main storage node;
performing, by the erasure acceleration module of the DPU, an erasure coding operation on the first data to obtain the plurality of data blocks and the plurality of check blocks, determining the address information of the target storage devices respectively corresponding to each data block and each check block of the first data according to the state information of each storage device in the object storage device (OSD) hash table lookup module, and sending the storage notification information to the target storage node where each storage device is located, wherein the same target storage device is configured to store one data block or one check block of the first data; and
sending, by the erasure acceleration module of the DPU in response to the data storage information sent by any target storage node, the data block or the check block of the first data corresponding to the data storage information to the target storage node for the storage.

19. A data read method for the data processing unit (DPU)-based storage system, applied to the storage system according to claim 6, and comprising:
in response to the data read operation of the client, obtaining the second data and the main storage node corresponding to the client;
sending, by the central processing unit (CPU) of the main storage node, data read information to the DPU of the main storage node in response to the data read operation of the client, wherein the data read information comprises the second data;
determining, by the erasure acceleration module of the DPU of the main storage node, the address information of the target read devices respectively corresponding to each data block and each check block of the second data through the object storage device (OSD) hash table lookup module, and obtaining the plurality of pieces of shard data of the second data stored in each target read device, wherein the shard data comprises the data block and the check block;
generating, by the erasure acceleration module of the DPU of the main storage node, the raw data of the second data according to the plurality of pieces of shard data of the second data, and sending the raw data to the CPU of the main storage node; and
sending, by the CPU of the main storage node, the raw data of the second data to the client.

20. A computer non-transitory readable storage medium, wherein the computer non-transitory readable storage medium stores a computer program, and the computer program implements the data storage method for the data processing unit (DPU)-based storage system according to claim 18 in response to being executed by a processor.

* * * * *